United States Patent [19]
Takami et al.

[11] Patent Number: 5,134,433
[45] Date of Patent: Jul. 28, 1992

[54] STROBE-INCORPORATED CAMERA

[75] Inventors: Satoshi Takami; Fuminori Ueno, both of Tokyo, Japan

[73] Assignee: Asahi Kogaku Kogyo Kabushiki Kaisha, Tokyo, Japan

[21] Appl. No.: 727,390

[22] Filed: Jul. 5, 1991

Related U.S. Application Data

[63] Continuation of Ser. No. 599,640, Oct. 18, 1990, abandoned.

[30] Foreign Application Priority Data

Oct. 19, 1989 [JP] Japan .................................. 1-272364

[51] Int. Cl.$^5$ ............................................ G03B 15/05
[52] U.S. Cl. ................................ 354/419; 354/149.11
[58] Field of Search ........................ 354/419, 149.11

[56] References Cited

U.S. PATENT DOCUMENTS

| Re. 29,599 | 3/1978 | Ogawa ................... 354/23 D |
| 4,130,356 | 12/1978 | Yamanaka ................. 354/145 |
| 4,472,042 | 9/1984 | Iwata et al. ................ 354/418 |
| 4,893,140 | 1/1990 | Yamamoto et al. ......... 354/149.11 |
| 4,910,542 | 3/1990 | Yamamoto et al. ......... 354/149.11 |
| 4,920,368 | 4/1990 | Arai et al. ................. 354/145.1 |
| 5,016,038 | 5/1991 | Kobayashi et al. .......... 354/418 |
| 5,028,949 | 7/1991 | Kawano ................... 354/403 |
| 5,036,345 | 7/1991 | Kawano ................... 354/126 |

FOREIGN PATENT DOCUMENTS 63-148928 9/1988 Japan .

OTHER PUBLICATIONS

Dec. 1988 issue of Shashin Kogyo disclosing a camera test for the Cannon EOS 750.

*Primary Examiner*—Michael L. Gellner
*Attorney, Agent, or Firm*—Sandler, Greenblum & Bernstein

[57] ABSTRACT

A camera having a strobe incorporated therein including a strobe light emitter which moves between a retracted position in which the light emitter is retracted in a camera body and an operative position in which the light emitter emits strobe light. An emission mode selecting device selectively sets an automatic light emission mode, in which the strobe light emitter emits strobe light upon exposure, when the brightness of an object to be taken is below a predetermined value. A compulsive light emission mode is provided, in which the light emitter compulsively emits the stobe light upon exposure, regardless of the object brightness. A light emitter moving and controlling device moves the light emitter to a waiting position, located between the retracted position and the operative position, and to the operative position when the automatic light emission mode and the compulsive emission mode are selected, respectively.

23 Claims, 8 Drawing Sheets

STROBE-INCORPORATED CAMERA

This application is a continuation of application Ser. NO. 599,640, filed Oct. 18, 1990, now abandoned.

BACKGROUND OF THE INVENTION

1. Field of the Invention

The present invention relates to a camera having a strobe incorporated therein, which has a light emitter movable between a retracted position and an operative position (light emitting position).

2. Description of the Related Art

The number of cameras having automatic light modulation type strobes has been recently increasing, because of easy handling thereof. A strobe-incorporated camera which has a strobe control apparatus is known, in which a light emitter of the strobe is supported by a supporting mechanism. One such example is a retractable mechanism or a pop-up mechanism that move between a retracted position in which the light emitter is retracted in the camera body and an operative position (i.e., a light emitting position in which the light emitter projects outward from the camera body). A strobe-incorporated camera which controls automatically the movement of the light emitter through an automatic light emission mode is also known.

In such a known strobe-incorporated camera, the control of strobe light emission is usually effected in accordance with exposure factors, such as brightness data of an object to be taken or calculated shutter speed data, at the automatic light emission mode. Namely, if the object brightness is below a predetermined value upon photographing, the light emitter is brought to the operative position to emit strobe light. After the strobe light is emitted, the light emitter is returned to the retracted position. Conversely, if the object brightness is above a predetermined value, the light emitter is kept in the retracted position, since no strobe light is necessary.

In the conventional camera having a strobe incorporated therein, as mentioned above, since the light emitter suddenly projects from the retracted position to the operative position at the automatic light emission mode to emit the strobe light without advance notice, the photographer or the person to be photographed may be surprised at the sudden protruding of the light emitter.

Furthermore, in a camera having two variable modes, one being on emission prohibition mode, at which no strobe light can be emitted, and the other being an automatic light emission mode, it is difficult to visibly confirm the selected mode by the appearance of the camera. Accordingly, there is a possibility that the actual set mode is different from the mode the photographer intended to select, thus resulting in a picture contrary to the photographer's intention.

SUMMARY OF THE INVENTION

The primary object of the present invention is to eliminate the above mentioned drawbacks by providing a strobe incorporated camera in which the light emission mode set by the photographer can be visibly confirmed from the appearance of the camera. As a result, this presents the photographer from taking a picture contrary to his or her intention, and reduces possible psychological shock which the photographer may feel upon photographing.

To achieve the object mentioned above, according to the present invention, there is provided a camera having a strobe incorporated therein including a strobe light emitter which moves between a retracted position in which the light emitter is retracted in a camera body and an operative position in which the light emitter emits strobe light. Also included are a mode selecting device for selectively setting an automatic light emission mode in which the strobe light emitter emits strobe light upon exposure when a brightness of an object to be taken is within a predetermined range and a compulsive light emission mode in which the light emitter compulsively emits the strobe light upon exposure, regardless of the object brightness. According to the present invention the improvement comprises a light emitter moving and controlling device for moving the light emitter to a waiting position located between the retracted position and the operative position when the automatic light emission mode is selected by the mode selecting device and to the operative position when the compulsive emission mode is selected by the mode selecting device.

With this arrangement, since the light emitter is moved to the waiting position and to the operative position when the automatic emission mode is selected and when the compulsive emission mode is selected, respectively, the mode can be easily and visibly confirmed from the appearance of the camera. Namely, since the light emitter is first moved to the waiting position prior to the movement to the operative position upon emitting the strobe light, the photographer can learn in advance that the strobe light may be emitted soon.

BRIEF DESCRIPTION OF THE DRAWINGS

The invention will be described below in detail with reference to the accompanying drawings, in which.

DESCRIPTION OF THE PREFERRED EMBODIMENTS

The following discussion will be addressed to preferred embodiments of the present invention directed to a powered retractable strobe.

Figure 2:
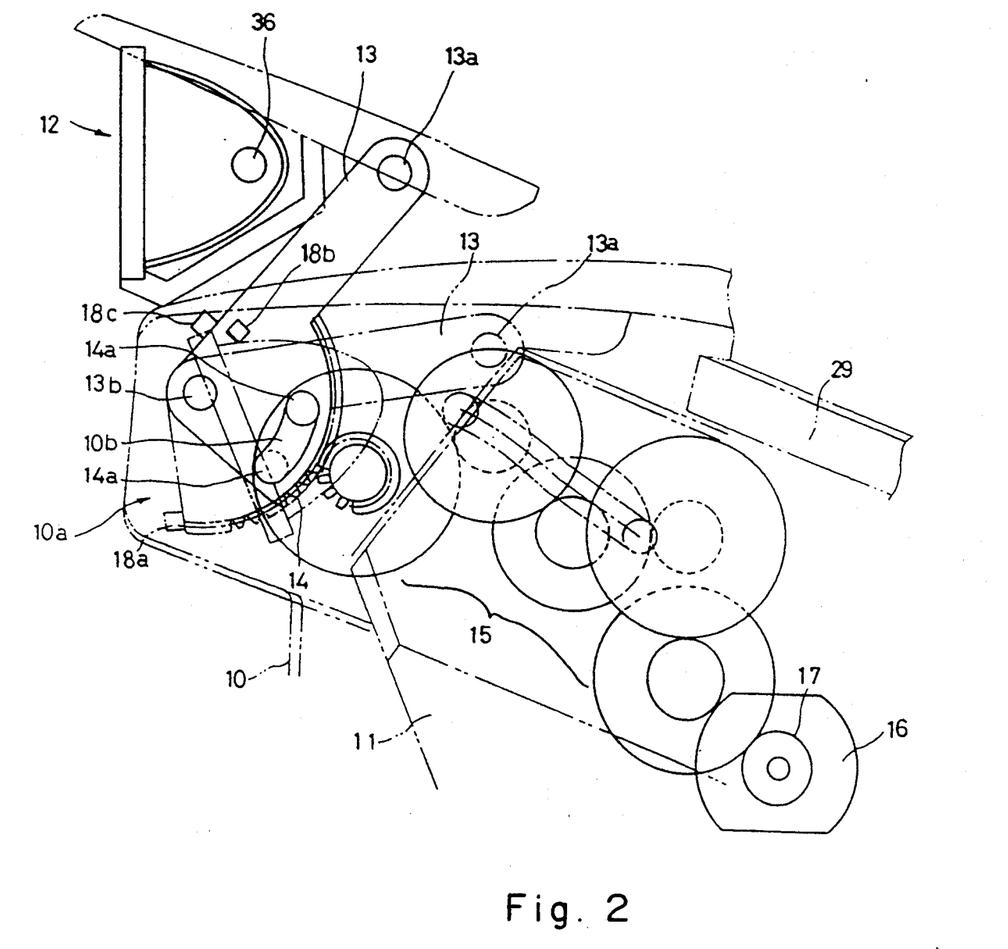
FIG. 2 is a conceptual view of a retractable strobe of a camera having a strobe control apparatus according to the present invention.
Figure 3:
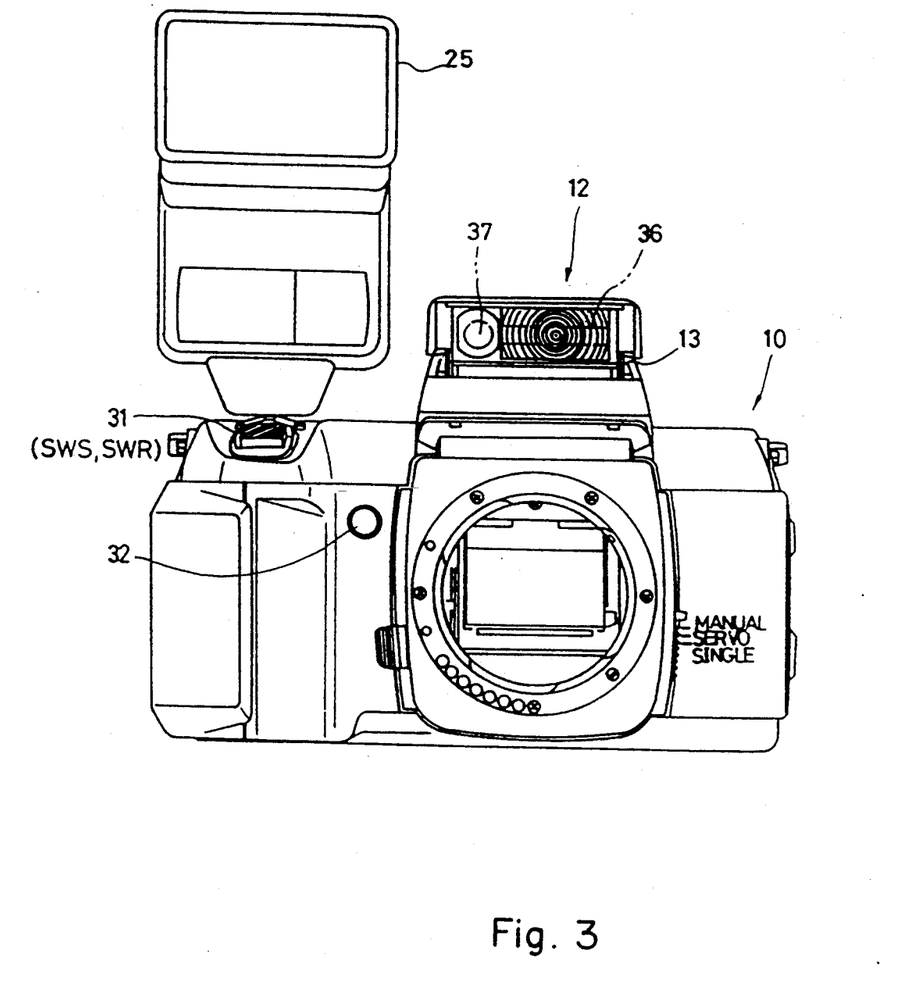
FIG. 3 is a front elevation view of a single-lens reflex camera having a strobe control apparatus according to the present invention, in which a light emitter is in an operative position.

In FIGS. 2 and 3, a camera body 10 is provided, on its upper portion (pentagonal prism 11), with a strobe light emitter 12 which is supported by a supporting mechanism. The strobe light emitter 12 moves between a retracted position (shown at an imaginary line in which the light emitter 12 is retracted in a receiving portion 10a) of the camera body 10 and an operative position (shown at a solid line in which the light emitter 12 protrudes from the receiving portion 10a). Note that only one of a pair of levers 13 which constitute the supporting mechanism is shown in FIG. 2.

Each of the lever 13 is pivotted at its one end to the rear end of the light emitter 12 through a shaft 13a and at its opposite end to the side wall of the receiving portion 10a provided in the camera body 10 through a shaft 13b. One of the levers 13 has a sector gear 14 having a center located on the center axis of the shaft 13b. The sector gear 14 is in mesh with a pinion 17 of a strobe motor 16 which constitutes a driving mechanism through a gear train 15. Consequently, the rotation of the strobe motor 16 is transmitted to the levers 13 through the gears 17, 15 and 14, As a result, the levers 13 rotate in opposite directions in accordance with the rotation of the motor 16 to move the strobe light emitter 12 between the retracted position(full down position), the waiting position (half up/down position) and the operative position (full up position), in this order or in the reversed order.

Figure 4:
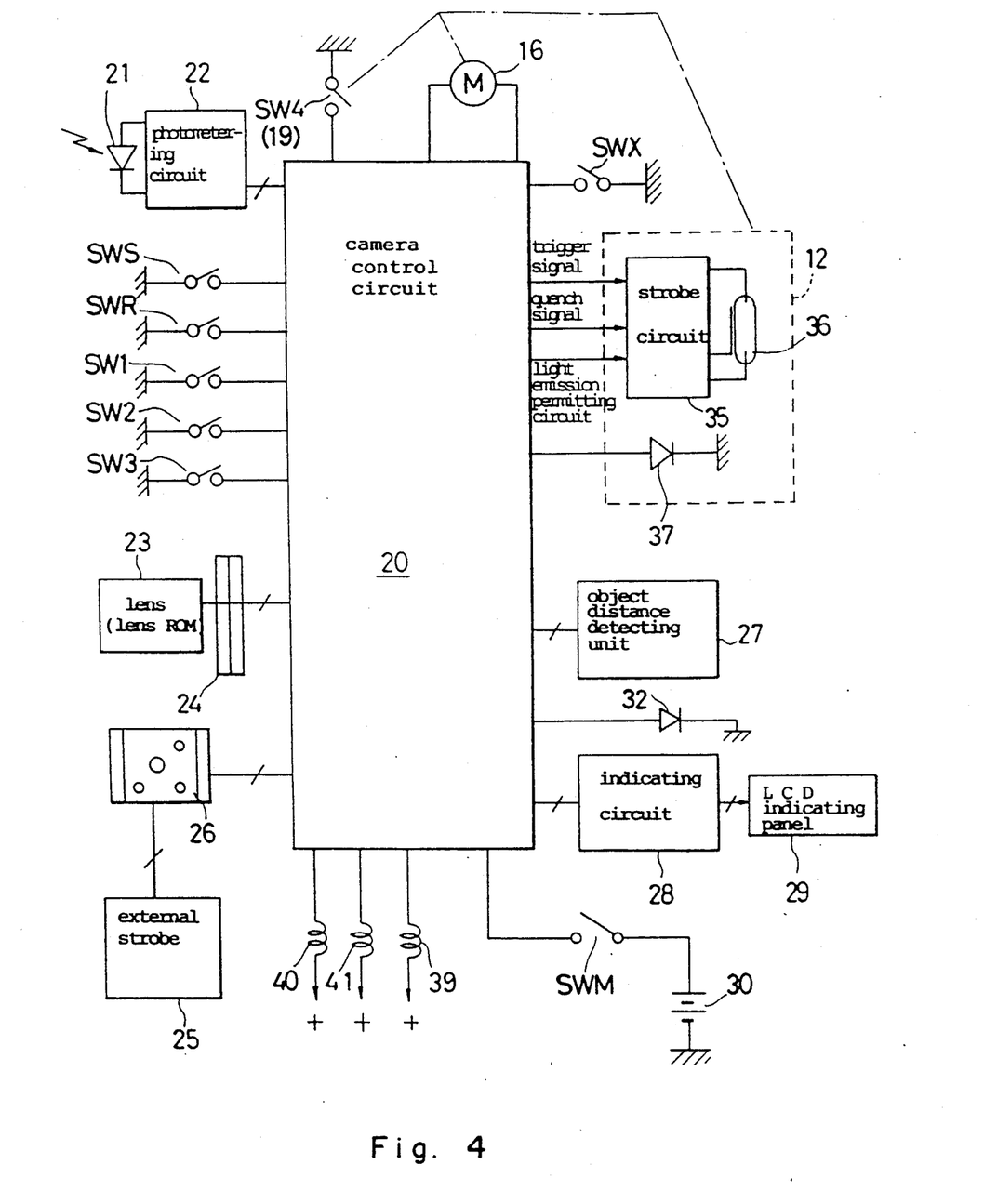
FIG. 4 is a block diagram of a strobe control apparatus of a camera according to the present invention; and, FIGS. 5A, 5B and 5C are flow charts of operations of the strobe control apparatus shown in FIG. 4.

Between the levers 13 and the camera body 10 are provided three limit switches 18a, 18b; and 18c. The first limit switch 18a is a retracted position detecting switch which is turned ON when the light emitter 12 is in the retracted position. The second limit switch 18b; is a waiting position detecting switch which is turned ON when the light emitter 12 is in the waiting position. The third limit switch 18c is an operative position detecting switch which is turned ON when the light emitter 12 is in the operative position. The operation of the strobe motor 16 is controlled by a camera control circuit 20 (FIG. 4). The light emitter 12 is selectively moved to the retracted position, the waiting position and the operative position, in accordance with the detection signals of the detecting switches 18a, 18b and 18c through the camera control circuit 20 (FIG. 4).

The sector gear 14 has a pin 14a provided thereon, which is fitted in an arched groove 10b having a center coaxial to the shaft 13b, formed in the camera body 10. The pin 14a and the arched groove 10b restrict the angular displacement of the sector gear 14 (are accordingly, the levers 13). Namely, the terminal angular positions of the levers 13 are defined by the engagement of the pin 14a with the opposite ends of the arched groove 10b. The terminal angular positions correspond to the operative position and the retracted position of the light emitter 12.

In the illustrated embodiment, an overload detecting circuit of the strobe motor 16 is provided to detect the overload which is produced, for example, when the movement of the light emitter 12 is intercepted by an external force or the like thereby, to stop the motor 16. The overload detecting circuit is contained in the camera control circuit 20 (FIG. 4), in the illustrated embodiment. Alternatively, it is possible to stop the strobe motor 16 at the retracted position and the operative position when the overload detecting means detects an increase of the load of the strobe motor 16 due to the abutment of the pin 14a with the terminal ends of the arched groove 10b.

The following discussion will be addressed to the circuit arrangement of the strobe control apparatus, according to the present invention, with reference to FIG. 4.

The camera control circuit 20 which generically controls the whole operations of the camera is usually comprised of a microcomputer. The camera control circuit 20 is connected to a photometering circuit 22 which logarithmically compresses the output of a photometering sensor 21. The photometering sensor 21 receives the object light in order that the photometering circuit 22 can process the output into predetermined photometer signals (brightness signals).

The camera control circuit 20 calculates the exposure factors (e.g., shutter speed Tv, diaphragm value, camera-shake limit shutter speed, etc.) in accordance with a predetermined algorism. The algorism is based on data, such as the film sensitivity data and the photometer signals outputted from the photometering circuit 22. The camera control circuit 20, the photometering sensor 21 and the photometering circuit 22 constitute a photometering device.

The camera control circuit 20 reads lens data issued by a lens ROM 23 (or CPU) which is provided in a photographing lens attached to the camera body, in accordance with a serial communication. Based on the read lens data, the kind of the lens attached to the camera body, a focal length of the lens, a minimum diaphragm value and an c!>en diaphragm value thereof, etc., can be obtained. Note that the camera control circuit 20 serves as a lens data input means. The serial communication is carried out through the electrical connection of a plurality of contacts provided on a mount 24.

To the camera control circuit 20 are connected contacts of a hot shoe 26 to which an external strobe 25 can be detachably attached. In cases of an external strobe 25 having a communication function, the strobe data is inputted from the external strobe 25 to the camera control circuit 20 through the hot shoe 26. The strobe information includes, for example, data of the type of the strobe, the guide numbers, and whether the strobe charging is completed, etc. On the other hand, light emission permitting signals, trigger signals and quench signals are inputted to the external strobe 25 from the camera control circuit 20.

An object distance measuring unit 27 includes the sensor which converts the object image formed by the photographing lens to an electrical signal and outputs the photometering signal necessary for the detection of the object distance (amount of defocus). The camera control circuit 20 calculates the amount of defocus in conjunction with the photometering signal and the lens data to perform the AF (Automatic Focusing) process for driving a focusing lens of the photographing lens to the focal position through an AF mechanism.

An LCD panel 29 is provided on the outer face of the camera body 10 and in the viewfinder of the camera. The indication of the LCD panel 29 is controlled by the camera control circuit through an indication circuit 28. In the illustrated embodiment, the LCD panel 29 indicates at least whether the photographing lens used is adaptable to the associated camera, and the permission and prohibition of the light emission of the strobe. Of course, it is possible to indicate other information on the photographing function of the camera, such as exposure program modes, shutter speed, diaphragm value, and "out of focus" and "in focus," etc. Numeral 32 in FIG. 3 designates a self-indicating LED which indicates that the photographing mode is in the self timer photographing mode.

To the camera control circuit 20 are connected various switches including a photometer switch (first switch) SWS, a release switch (second switch) SWR, a self switch SW1, a light emission selecting switch SW2, an improper lens canceling switch SW3 and the above-mentioned position detecting switches 18a, 18b; and 18c.

The photometer switch SWS and the release switch SWR are associated with the release button 31 (FIG. 3), so that when the release button 31 is pushed down by a half step, the photometer switch SWS is turned ON and when the release button is pushed down by full step, the release switch SWR is turned ON. When the photometer switch SWS is turned ON, the photometering circuit 22 and the object distance detecting unit 27, etc., begin operating. When the release switch SWR is turned ON, the operation is changed to the release operation.

The self switch SW1 is a switch for operating the self timer, so that when the self switch SW1 is turned ON, the mode becomes a self timer mode in which when the release switch SWR is turned ON, the self operation starts and the release operation starts at predetermined time thereafter.

The light emission selecting switch SW2 is a switch for changing the light emission mode of the strobe. Every time the light emission selecting switch SW2 is turned ON, the emission mode changes cyclically between the compulsive emission mode, the emission prohibition mode, and the automatic emission mode (in this order). At the automatic emission mode, the emission of the strobe light is controlled in accordance with the object brightness detected by the photometering circuit 22 and the lens data read from the lens ROM 23. At the compulsive light emission mode, the strobe light is compulsively emitted regardless of the object brightness. At the emission prohibition mode, no strobe light can be emitted regardless of the object brightness. When the calculated shutter speed is higher than the strobe synchronous speed, the camera control circuit 20 sets the shutter speed (upon releasing) to be identical to the strobe synchronous speed.

The improper lens cancelling switch SW3 is a switch for indicating whether the lens data read by the lens ROM 23 should or should not be utilized to judge the strobe light emission. The improper lens cancelling switch SW3 is actuated, for example, when the strobe light should be compulsively emitted in spite of the angle of view of the attached lens being larger than the strobe illuminating angle.

The position detecting switches 18a, 18b; and 18c (FIG. 2), which detect the position of the light emitter 12, are turned ON when the light emitter is in the restricted position, the waiting position and the operative position, respectively. The detecting switch 18c serves also as an upward movement detecting switch SW4 for detecting the full up position of the light emitter.

The camera has a main power switch SWM which is turned ON to supply the camera control circuit 20 with the electrical power from the battery 30. When the main power switch SWM is turned OFF, the backup power is supplied to the least necessary number of memories. For example, memories needed for memorizing the number of frames of film, so that the camera control circuit 20 performs only a partial control operation. The camera control circuit 20 performs the main loop of operation for checking whether or not any switch operation is carried out at a predetermined interval of time when the main power switch SWM is turned ON. When the switch operation is carried out, the sub-routine of the operation is performed.

A strobe circuit 35, which causes the strobe (light emitting tube 36) to emit the strobe light, and an auxiliary light emitting LED 37 adjacent to the light emitting tube 36 are connected to the camera control circuit 20. The camera control circuit 20 outputs the light emission permitting signal, the trigger signal and the quench signal to the strobe circuit 35. The camera control circuit 20 serves as a strobe control device.

The light emission permitting signal permits the light to be emitted when the necessary conditions for emitting the strobe light are satisfied, so that the strobe commences the preparatory operations for the light emission, such as strobe charging, upon receipt of the light emission permitting signal.

The trigger signal is a signal for emitting the strobe light. The quench signal is a signal for stopping the light emission when the amount of light by the strobe reaches an optimum value. The auxiliary light emitting LED 37 emits a contrast pattern onto the object to assist the measurement of the object distance by the object distance measuring unit 27 when the object brightness or contrast is small.

To the camera control circuit 20 are connected a release magnet 39, which releases the mechanical charge of a mirror and shutter curtains (leading curtain and trailing curtain) when the release switch SWR is turned ON, and leading and trailing curtain magnets 40 and 41. The trailing curtain magnets 40 and 41 which engage with the leading curtain and trailing curtain in place of the mechanical engagement and sequentially release the engagement thereby, to move the leading and trailing curtains so as to obtain a desired shutter speed, respectively. The X contact switch SWX is a switch for emitting the strobe light from the conventional external strobe 25 which has less function (no communication function) and is turned ON after the movement of the leading curtain ends to emit the strobe light from the external strobe 25 through the hot shoe 26.

The strobe control apparatus of a camera of the present invention, as constructed above operates as described below.

The general operation of the apparatus will be first briefly explained below with reference to FIGS. 1A, 1B and 1C.

In the strobe control apparatus of the invention, when the compulsive emission mode is selected by the emission mode selecting switch SW2, the light emitter 12 is moved up from the retracted position (FIG. 1B) to the operative position (FIG. 1C) to charge the light emitter. The light emitter 12 will emit strobe light when the release switch SWR is turned ON. The light emitter 12 remains in the operative position until the compulsive emission mode is released or the main power switch SWM is turned OFF.

Figure 1A:
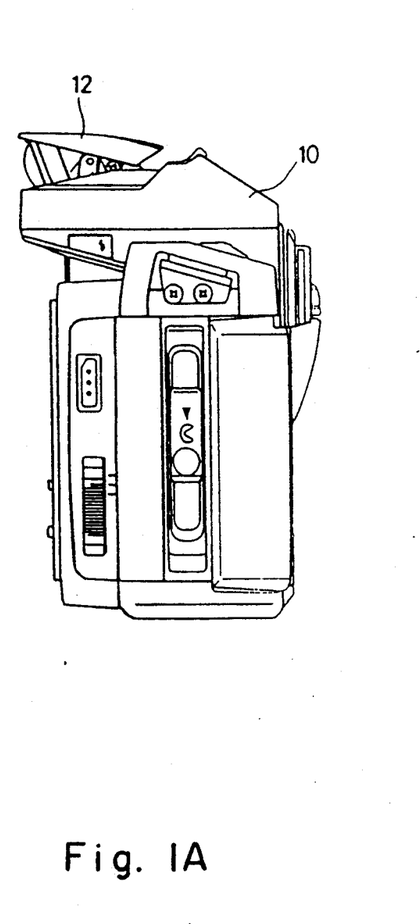
FIGS. 1A, 1B and 1C are schematic side elevation views of a light emitter of a single-lens reflex camera having a strobe control apparatus according to the present invention, shown in a waiting position, a retracted position and an operative position, respectively.
Figure 1B:
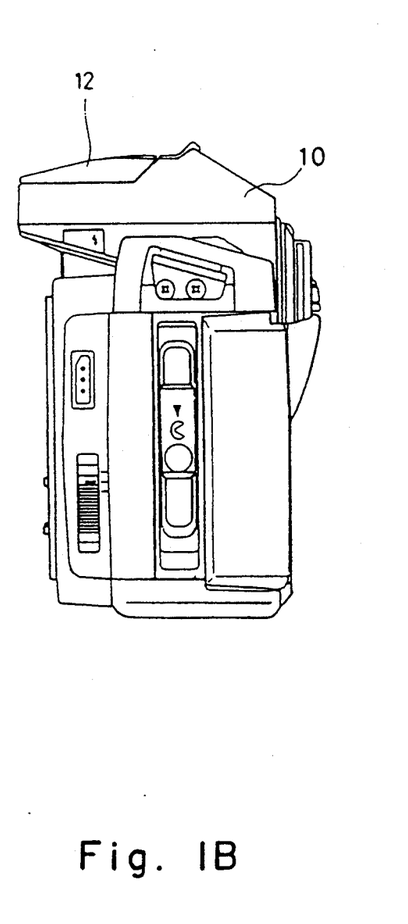
Figure 1C:
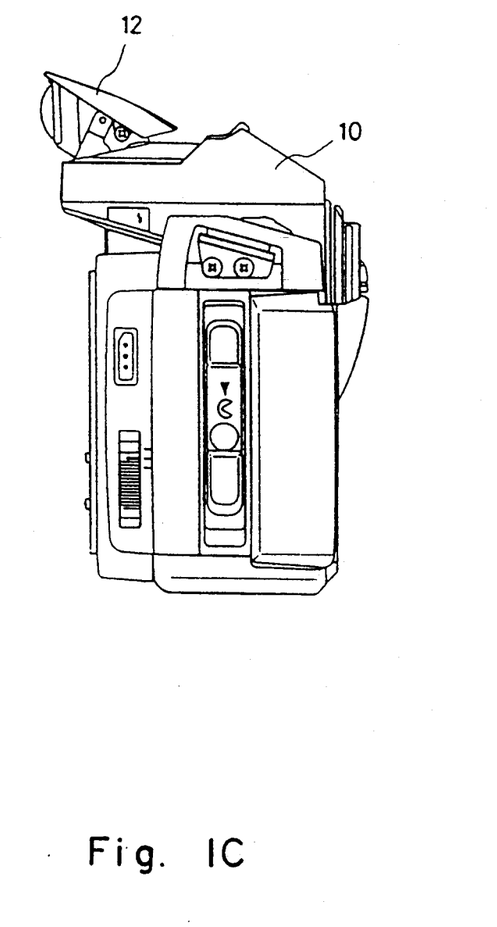

When the automatic emission mode is selected, and when the main power switch SWM is turned ON, the light emitter 12 is moved by a half displacement to the waiting position (FIG. 1A). When the photometering switch SWS is turned ON, the light emitter 12 is moved to the operative position (FIG. 1C) upon the judgement that the emission of 5 the strobe light is necessary. Thereafter, when the release switch SWR is turned ON, the strobe light is emitted. Upon completion of the emission of the strobe light, the light emitter 12 is moved down to the waiting position (FIG. 1A). Thereafter, if the main power switch SWM is turned OFF, or if the mode is changed to the emission prohibition mode, the light emitter will be moved down further to the retracted position (FIG. 1B). It is possible to charge the strobe while the light emitter 12 is in the waiting position (FIG. 1A).

When the emission prohibition mode is selected, the light emitter 12, if not already in the retracted position, is moved down to the retracted position even if the main power switch SWM is turned ON, so that no strobe light is emitted even if the object to be taken is dark.

Also at the self timer photographing mode, the light emitter 12 is moved in accordance with the selected emission mode when the main power switch SWM is turned ON. For instance, in the illustrated embodiment, at the commencement of the self timer photographing, the light emitter 12 is moved up to the operative position when the mode is the compulsive emission mode. When photographing in the automatic emission mode, the light emitter 12 is first moved up by a half displacement to the waiting position and is then fully moved up to the operative position, when it is judged that the strobe light should be emitted at a predetermined time before.

More detailed explanation for the operation of the control apparatus of the present invention will be given below with reference to the flow charts shown in FIGS. 5A, 5B and 5C). In the present invention the operation is performed in accordance with a program stored in a memory of the microcomputer of the camera control circuit 20 (FIG. 4).

Figure 5A:
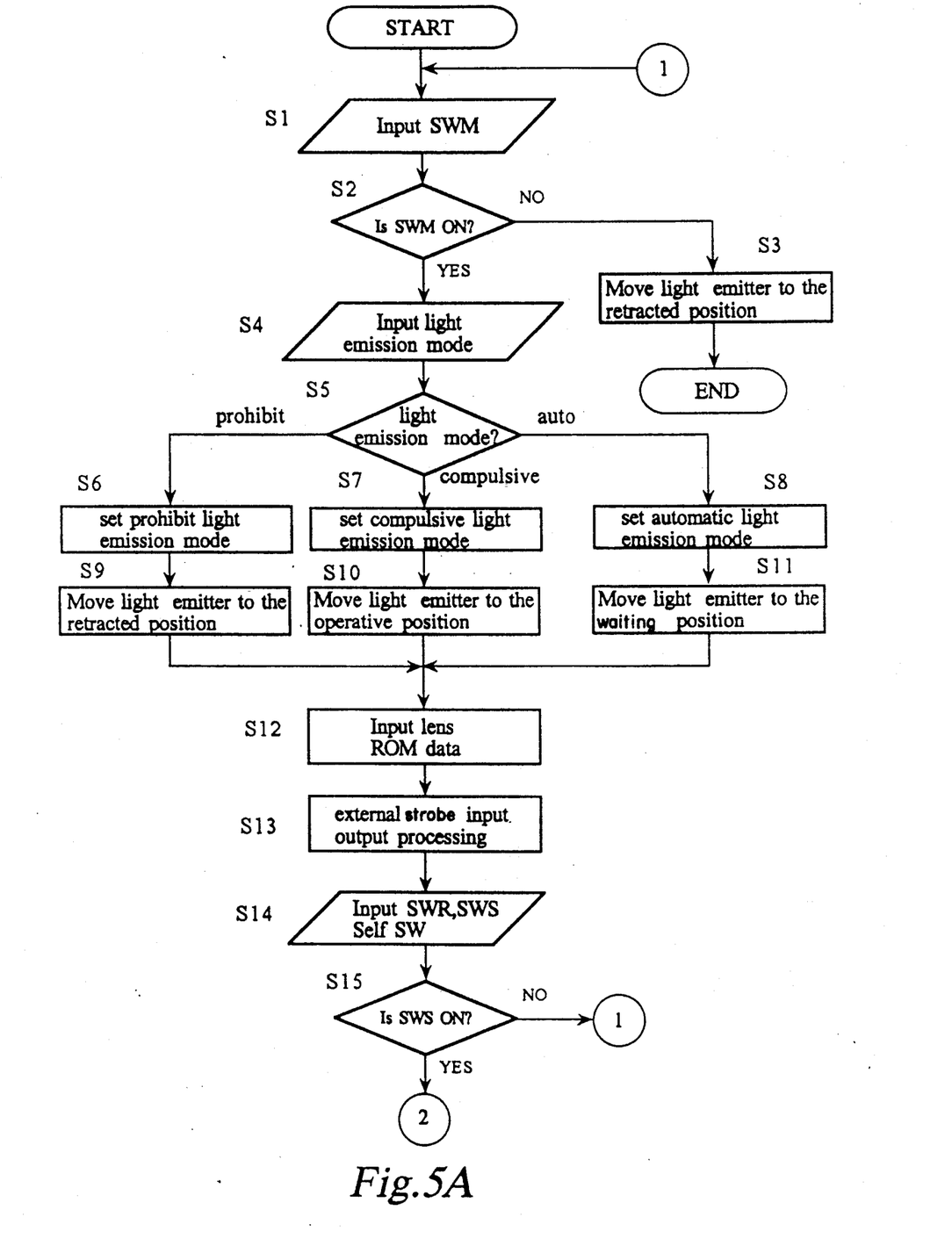
Figure 5B:
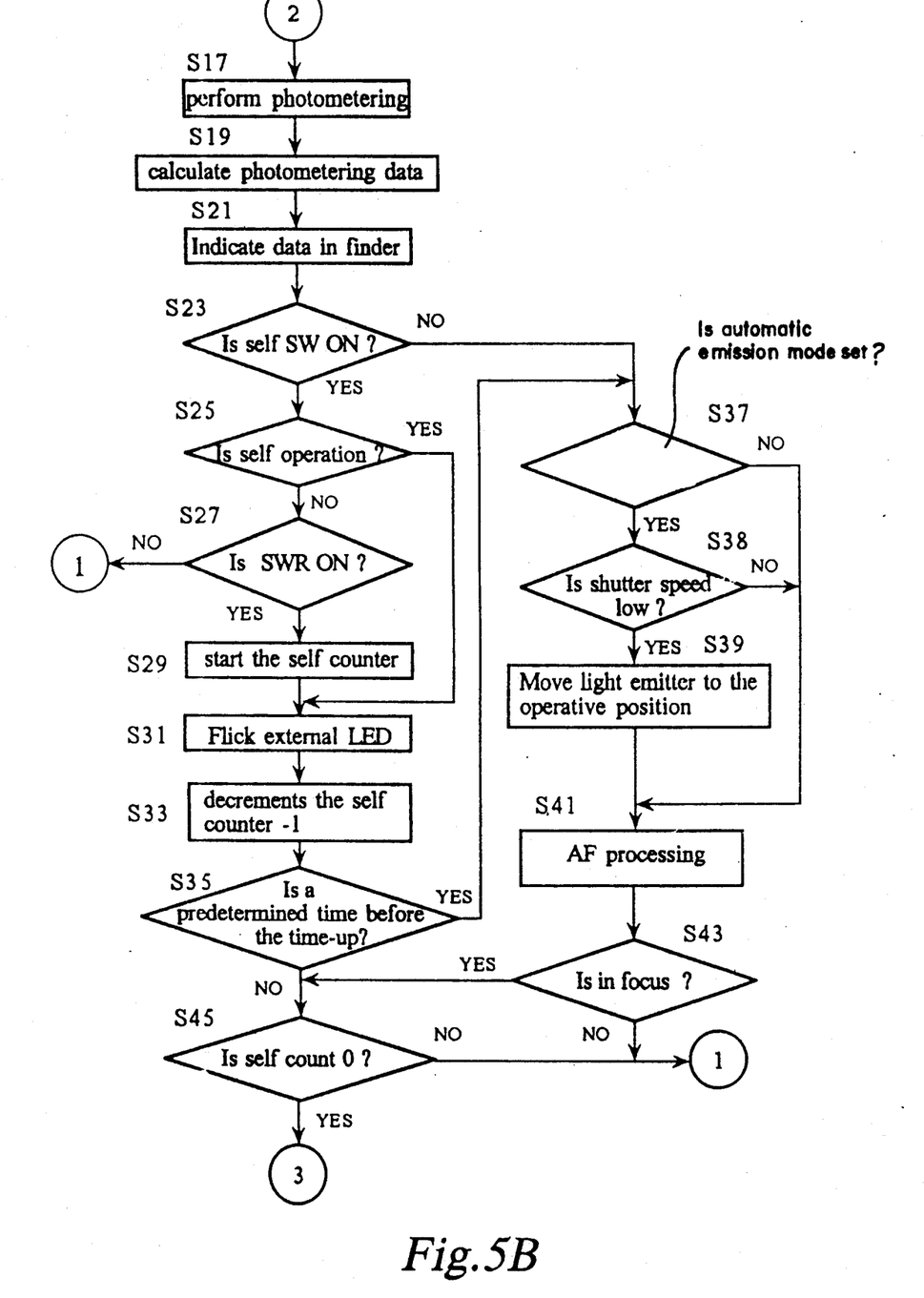
Figure 5C:
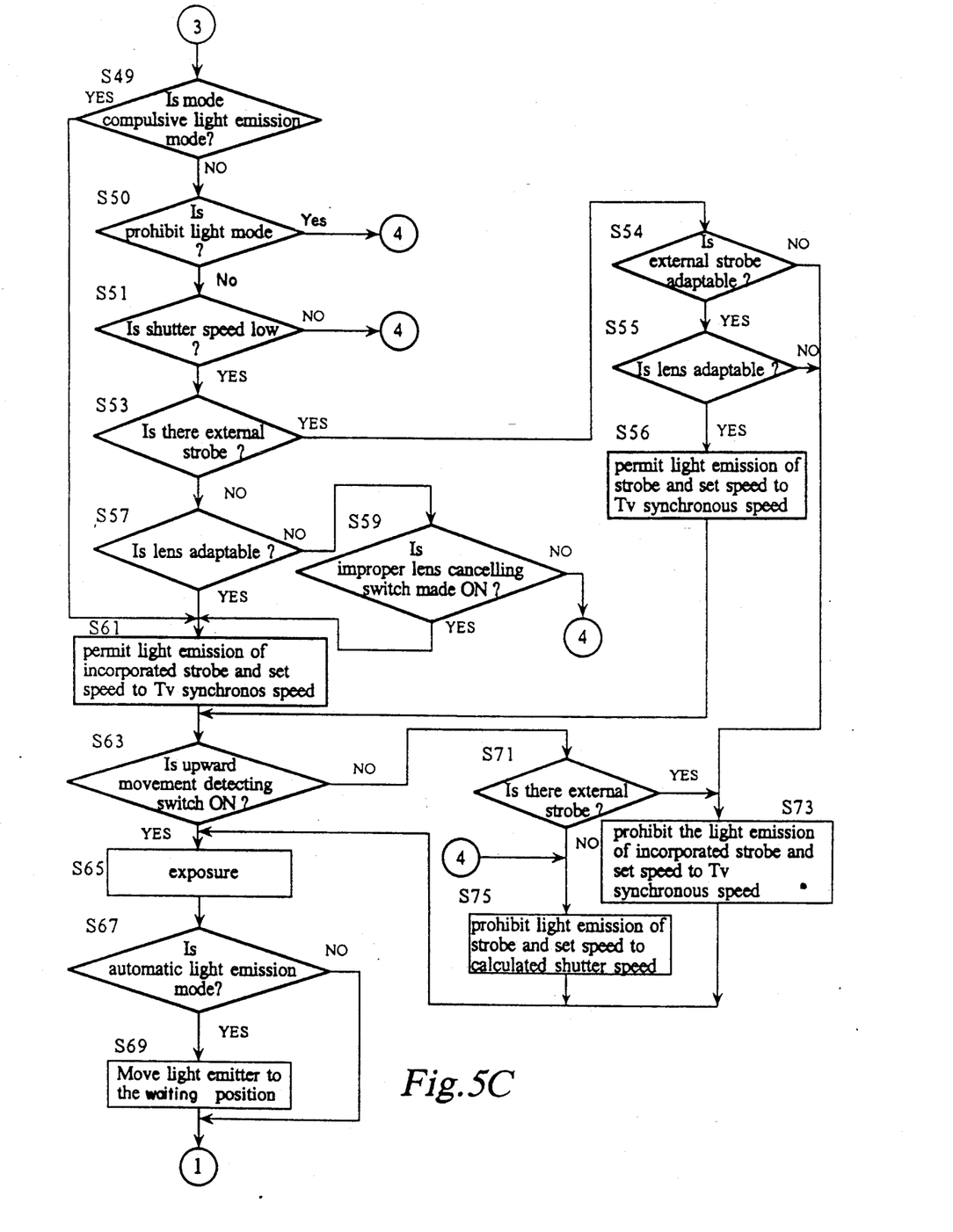

When the necessary conditions are satisfied, for example, when the battery 30 is charged and when the back cover (not shown) of the camera is closed, the camera control circuit 20 begins operating in accordance with the flow charts shown in FIGS. 5A, 5B and 5C.

First, ON/OFF data of the main power switch SWM is inputted to the microcomputer to check whether or not the main power switch SWM is turned ON (steps S1 and S2). If the main power switch SWM is not turned ON, the light emitter 12 is moved to the retracted position if it is not already in the retracted position (step S3). If the main power switch SWM is turned ON, the control proceeds to step S4.

At step S4, the data of the mode set by the emission selecting switch SW2 is inputted to the microcomputer to set the selected mode (steps S5, S6, S7 and S8). If the emission prohibition mode is set, (S6) the light emitter 12 is moved down to the retracted position (step S9), and if the compulsive emission mode is set, (S7) the light emitter 12 is moved up to the operative position (step S10). If the automatic light emission mode is set, (S8) light emitter 12 is moved up by a half displacement to the waiting position (step S11).

Thereafter, the camera control circuit 20 reads the lens data stored in the lens ROM 23 (step S12). Signal transmission is initiated between the camera body and the external strobe 25 through the hot shoe 26 (step S13). The data stored in the lens ROM 23 includes data to judge whether the lens is adaptable to the camera (i.e., whether the lens does not interfere with the emission of the strobe light by the external strobe), open diaphragm value data, minimum diaphragm value data, and focal length data, etc. The data from the external strobe 25 includes data to judge whether or not the external strobe 25 :s adaptable to the camera (i.e., whether the external strobe does not interfere with the upward movement of the light emitter 12), and the guide number, etc.

The switch data (ON/OFF data) of the switches SWS and SWR, etc., is inputted to the microcomputer; to check whether the switches are turned ON (steps S14 and S15). If the photometer switch SWS is turned OFF, the control is returned to step S1 to repeat the operations mentioned above until the photometer switch SWS is turned ON.

When the photometer switch SWS is turned ON, the camera control circuit 20 calculates the exposure factors, such as a shutter speed Tv, and diaphragm value Av, etc., based on the photometer signal output from the photometering circuit 22 and the film sensitivity data, etc., in accordance with a predetermined algorism at steps S17 and S19. Thereafter, the camera control circuit 20 causes the LCD panel 29 (FIG. 4) to indicate the various values set in the camera through the indicating circuit 28 (step S21). The indicated information includes the calculated exposure factors.

Thereafter, whether or not the self switch SW1 is turned ON is checked, (i.e., whether or not the mode is the self timer photographing mode) is checked at step S23. If the mode is the self timer photographing mode, the control proceeds to step S25. If the mode is not the self timer photographing mode, the control proceeds to step S37.

At step S25, whether or not the operation is the self operation is checked. If the operation is not the self operation, whether or not the release switch SWR is turned ON is checked (step S27). If the release switch SWR is turned ON, the self counter starts, that is, the self photographing operation starts (step S29). The operation under the self timer mode is indicated to the flickering of the self indicating LED 32 (FIG. 3) and the decrement of the self counter is performed (steps S31 and S33).

At step S25, if the mode is the self timer photographing mode, (i.e., the self operation has already commenced) the control skips to step S31 to continue the self timer photographing operation. Even if the self timer photographing mode is set, if the release switch SWR is not turned ON, the control is returned to step S1 from step S27.

At step S35, whether or not the time of the self timer is equivalent to a predetermined time before the time-up is checked. If the time is equivalent to a predetermined time before the time-up, the control skips to step S45. If the time is equivalent to a predetermined time before the time-up, the control proceeds to step S37 for the AF operation.

At step S37, whether or not the mode is the automatic emission mode is checked. If the mode is the automatic emission mode, whether or not the calculated shutter speed is below a predetermined value is checked (step S38). If the calculated shutter speed is below a predetermined value, the light emitter 12 is moved up to the operative position to lighten the auxiliary light emitting LED 37 (step S39). Thereafter, the control proceeds to step S41. Conversely, if the mode is not the automatic light emission mode, as determined at step 37 or even when the mode is the automatic light emission mode and if the calculated shutter speed is not below a predetermined value, (step S38) the control skips to step S41.

At step S41, the object distance is detected through the object distance detecting unit 27. so that the AF process in which the focusing lens (not shown) of the photographing lens is moved to the focal position in accordance with the detected object distance (amount of defocus) is performed. Thereafter, whether or not the focusing lens is focused is checked at step S43. If the focusing is finished, the control proceeds to step S49 when the release switch SWR is turned ON at the normal photographing mode. On the other hand, at the self timer photographing mode, the control proceeds to step S49 when the time of the self counter is up (step S45).

Conversely, if no focusing is completed, or even if the focusing is completed and the release switch SWR is not turned ON or when the time of the self timer is not 0, the control is returned to step S1. repeated after the object is "in focus until the release switch SWR is turned ON at the normal photographing mode or until the self counter becomes 0 at the self timer photographing mode, respectively. When any one of these requirements is satisfied, the control proceeds to step S49.

At step S49, whether or not the mode is compulsive light emission mode is checked. If the mode is not the compulsive light emission mode, the control proceeds to step S50. Conversely, if the mode is the compulsive light emission mode, the control skips to step S61.

At step S50, whether or not the mode is the emission prohibition mode is checked. If the mode is the emission prohibition mode, the control skips to step S75 since no strobe light is emitted. Conversely, if the mode is not the emission prohibition mode, that is, if the mode is the automatic emission mode, the control proceeds to step S51. At step S75, the strobe is prohibited from emitting the strobe light, and the shutter speed Tv upon exposure is set to be identical to the calculated shutter speed. Thereafter, the control proceeds to step S65.

At step S51, whether or not the calculated shutter speed is below a predetermined value is checked. If the calculated shutter speed is not below a predetermined value, the control skips to step S75, since no strobe light is necessary. If the calculated shutter speed is below a predetermined value, the control proceeds to step S53 to emit the strobe light.

At step S53, whether or not the external strobe is attached is checked. If the external strobe is attached, whether or not the external strobe meets the camera requirements is checked (step S54). If the external strobe does not meet the camera requirements, since the light emitter 12 can not move up to the operative position, the control skips to step S73 to prohibit the light emission of the incorporated strobe and to set the shutter speed upon releasing to be identical to the strobe synchronous speed. Thereafter, the control proceeds to step S65 to perform the exposure.

If the external strobe meets the camera requirements, whether or not the property of the attached photographing lens meets the property of the incorporated strobe is checked (step S55). Namely, whether or not the illuminating angle of the incorporated strobe covers the angle of view is checked. If the property of the attached photographing lens does not meet the property of the incorporated strobe, the control proceeds to step S73 to prohibit the light emission of the incorporated strobe, since even if the strobe light is emitted, no object is correctly illuminated with the strobe light. Conversely, if the property of the attached photographing lens meets the property of the incorporated strobe, the control proceeds to step S56 to permit the light emission of the incorporated strobe and to set the shutter speed upon releasing to be identical to the strobe synchronous speed. Thereafter, the control proceeds to step S63.

If the external strobe is not attached at step S53, whether or not the incorporated photographing lens meets the camera requirements is checked at step S57. If the incorporated photographing lens melts the camera requirements, the control proceeds to step S61. If the incorporated photographing lens does not meet the camera requirements, the control proceeds to step S59 to check whether or not the improper lens cancelling switch SW3 is turned ON. If the improper lens cancelling switch SW3 is not turned ON, the control proceeds to step S75, since no incorporated strobe emits the strobe light. Conversely, if the improper lens releasing switch SW4 is turned ON, the control is returned to step S61 to emit the strobe light of the incorporated strobe.

At step S61, the light emission of the incorporated strobe is permitted and the shutter speed Tv upon exposure is set to be identical to the strobe synchronous speed. Thereafter, whether or not the upward movement detecting switch SW4 is turned ON (i.e., whether or not the light emitter 12 comes to the operative position) is checked at step S63. If the light emitter 12 is not moved to the operative position, the control proceeds to step S71, since no strobe light can be emitted. If the light emitter 12 is moved to the operative position, the control proceeds to step S65.

At step S65, the exposure is carried out under the conditions set at step S56 or step S61 (or steps S73 and 75).

Upon the completion of the exposure, whether or not the mode is the automatic light emission mode is checked (step S67). When the mode is the automatic light emission mode, the light emitter 12 is moved down by a half displacement to the waiting position if it is in the operative position (step S69). Thereafter, the control is returned to step S1.

If the light emitter 12 is not moved to the operative position at step S63, the incorporated strobe light emitter 12 is prohibited from emitting the strobe light, since even if the strobe light is emitted, the object can not be correctly illuminated therewith. If the external strobe is attached to the camera, the strobe is emitted only from the external strobe. At step S71, whether or not the external strobe is attached to the camera is checked. If the external strobe is attached, the external strobe emits the strobe light at step S73. If no external strobe is attached, the control proceeds to step S75 to prohibit the incorporated strobe from emitting the strobe light.

Thereafter, the control proceeds from step S73 or step S75 to step S65 to effect the exposure under the conditions set at step S56, S61, S73 or S75.

Upon completion of exposure, whether or not the mode is the automatic emission mode is checked (step S67). When the mode is the automatic light emission mode, the light emitter 12 is moved down to the waiting position, if it is in the operative position (step S69). Thereafter, the control is returned to step S1. If the mode is other than the automatic emission mode, that is, if the mode is the compulsive emission mode, the control is directly returned to step S1 from step S67.

As can be understood from the above discussion, in a camera having a strobe control circuit according to the present invention, the light emitter is moved to the operative position when only the main power switch SWM is turned ON at the compulsive emission mode. On the other hand, when only the main power switch SWM is turned on, at the automatic light emission mode and at the emission prohibition mode, the light emitter is moved up by a half displacement to the waiting position and down to the retracted position, respectively. Accordingly, a user can easily and visibly confirm the photographing mode from the position of the light emitter.

Furthermore, at the automatic emission mode, the light emitter is moved up to the waiting position when the main power switch SWM is turned ON. Thereafter, the light emitter 12 is fully moved up to the operative position when the photometer switch SWS is turned ON and when the calculated shutter speed is below a predetermined value, so that the strobe light is emitted from the light emitter 12 when the release switch SWR is turned ON. Consequently, the individual to be photographed would not be surprised at the upward movement of the light emitter 12.

Furthermore, since the emission mode can be learned from the position of the light emitter (appearance of the camera), there is no possibility that the photographer would incorrectly set the emission mode, so that the photographer can take a picture he or she intends.

The present invention is not limited to the illustrated embodiments. For instance, it is possible to move the light emitter 12 to the operative position when the photometer switch SWS is turned ON at the compulsive emission mode, and when the release switch SWR is turned ON at the automatic emission mode, respectively.

In addition, the supporting mechanism of the light emitter 12 is not limited to the illustrated mechanism and can be realized for example by a pop-up mechanism which linearly moves the light emitter up and down.

As can be seen from the above discussion, according to the present invention, since the light emitter is moved up to the waiting position and the operative position at the automatic emission mode and the compulsive emission mode, respectively, the photographer and the human object to be taken can easily and visibly learn the emission mode from the position of the light emitter of the strobe. Therefore, the drawbacks of the prior art in which the photographer and/or the photographed object does not properly anticipate the emission mode.

We claim:

1. A camera having a strobe incorporated therein including a strobe light emitter which moves between a retracted position in which said strobe light emitter is retracted in a camera body and an operative position in which said strobe light emitter emits strobe light, comprising:

an emission mode selecting means for selectively setting an automatic light emission mode in which said strobe light emitter emits strobe light upon exposure, when a brightness of an object to be taken or a shutter speed is within a predetermined range; and a light emitter moving and controlling means for moving said strobe light emitter to a waiting position located between said retracted position and said operating position when said automatic light emission mode is selected by said emission mode selecting means.

2. A strobe-incorporated camera according to claim 1, wherein said light emitter moving and controlling means moves said strobe light emitter from said waiting position to said operating position when the brightness of an object to be taken or a shutter speed is within a predetermined range.

3. A strobe-incorporated camera according to claim 1, further comprising a compulsive light emission mode in which said strobe light emitter compulsively emits strobe light upon exposure, regardless of the object brightness which is selected by said emission mode selecting means.

4. A strobe-incorporated camera according to claim 3, wherein said light emitter moving and controlling means moves said strobe light emitter to said operative position when said compulsive light emission mode is selected by said emission mode selecting means.

5. A strobe-incorporated camera according to claim 3, further comprising a main power switch means for supplying said emission mode selecting means and the light emitter moving and controlling means with power, so that when said main power switch means is activated, the light emitter moving and controlling means performs the operation.

6. A strobe-incorporated camera according to claim 3, wherein said light emitter moving and controlling means still holds said strobe light emitter, which has been moved to the operative position at said compulsive light emission mode, in said operative position after the completion of the emission strobe light.

7. A strobe-incorporated camera according to claim 1, wherein said emission mode selecting means includes an emission prohibition mode in which no strobe light can be emitted, so that when said emission prohibition mode is selected by said emission mode selecting means, said light emitter moving and controlling means keeps said strobe light emitter in said retracted position.

8. A strobe-incorporated camera according to claim 1, further comprising a main power switch means for supplying said emission mode selecting means and said light emitter moving and controlling means with power, so that when said main power switch means is activated, said light emitter moving and controlling means performs the operation.

9. A strobe-incorporated camera according to claim 8, wherein said light emitter moving and controlling means moves said strobe light emitter to said retracted position when said main power switch means is turned from ON to OFF.

10. A strobe-incorporated camera according to claim 1, wherein said light emitter moving and controlling means moves said strobe light emitter, which has been moved to said operative position at said automatic light emission mode, to said waiting position upon the completion of the emission of strobe light.

11. A strobe-incorporated camera according to claim 1, further comprising a retractable supporting mechanism which supports said strobe light emitter so as to move between said retracted position and said operative position.

12. A strobe-incorporated camera according to claim 11, wherein said retractable supporting mechanism comprises a motor drive for moving said strobe light emitter.

13. A strobe-incorporated camera according to claim 11, wherein said retractable support mechanism comprises a stop means for restricting said strobe movement of the light emitter at said retracted position and the operative position, respectively.

14. A strobe-incorporated camera according to claim 1, further comprising three position detecting switches which detect said retracted position, the waiting position and the operative position, of said strobe light emitter, respectively.

15. A strobe-incorporated camera according to claim 14, wherein said light emitter moving and controlling means moves and stops said strobe light emitter to said retracted position, said waiting position and said operative position, in response to the detection of said respective position detecting switches.

16. A camera having a strobe incorporated therein according to claim 1, wherein said strobe light emitter is positioned at the waiting position, located between said retracted position and said operating position, only when said automatic light emission mode is selected.

17. In a camera having a strobe incorporated therein including a strobe light emitter which moves between a retracted position in which said strobe light emitter is retracted in a camera body and an operative position in which said strobe light emitter emits strobe light, a photometering means for arithmetically calculating exposure factors, and an exposure means, comprising:
- a strobe judging means for judging whether strobe light should be emitted from said strobe light emitter in accordance with the exposure factors obtained by said photometering means;
- an emission mode selecting means for selectively setting an automatic light emission mode in which said strobe light emitter emits strobe light upon exposure when said strobe judging means judges that the strobe light should be emitted, and a compulsive light emission mode in which said strobe light emitter compulsively emits the strobe light upon the operation of said exposure means, regardless of the exposure factors; and,
- a light emitter moving and controlling means for moving said strobe light emitter to a waiting position located between said retracted position and said operative position, and to said operative position when said automatic light emission mode and said compulsive emission mode are selected by said emission mode selecting means, respectively.

18. A strobe-incorporated camera according to claim 17, further comprising a first switch means for actuating said photometering means, and a second switch means for actuating said exposure means.

19. A strobe-incorporated camera according to claim 18, wherein said light emitter moving and controlling means first moves said strobe light emitter to said waiting position when said automatic emission mode is selected by said emission mode selecting means, and then to said operative position when said first switch means is actuated and said strobe judging means judges that the strobe light should be emitted.

20. A strobe-incorporated camera according to claim 18, wherein said light emitter moving and controlling means moves said strobe light emitter to said operative position when said compulsive emission mode is selected by said emission mode selecting means and when said first switch means is actuated.

21. A strobe-incorporated camera according to claim 18, wherein said light emitter moving and controlling means moves said strobe light emitter, which has been moved to said operative position at said automatic emission mode, to said waiting position after the completion of the emission of the strobe light subsequent to the operation of said second switch means.

22. A strobe-incorporated camera according to claim 18, wherein said light emitter moving and controlling means moves said strobe light emitter, which has been moved to said operative position at said automatic emission mode, to said waiting position when the operation of said first switch means is released.

23. A camera having a strobe incorporated therein according to claim 17, wherein said strobe light emitter is positioned at the waiting position, located between said retracted position and said operating position, only when said automatic light emission mode is selected.

* * * * *

UNITED STATES PATENT AND TRADEMARK OFFICE
CERTIFICATE OF CORRECTION

PATENT NO. : 5,134,433
DATED : July 28, 1992
INVENTOR(S) : S. Takami et al

It is certified that error appears in the above-indentified patent and that said Letters Patent is hereby corrected as shown below:

Column 12, line 8, change "the" to —said—.
Column 12, line 11, change "the" to —said—.
Column 12, line 54, change "support" to —supporting—.
Column 12, line 55, change "said strobe" to —the—.
Column 12, line 56, change "the" to —said strobe—.
Column 12, line 56, change "the" to —said—.

Signed and Sealed this

Seventeenth Day of October, 1995

*Attest:*

BRUCE LEHMAN

*Attesting Officer*  Commissioner of Patents and Trademarks